United States Patent [19]

Castagna

[11] 4,281,224
[45] Jul. 28, 1981

[54] GRILLE COVERED SPEAKER ASSEMBLY CONSTRUCTION FOR COMPACT AUTOMOBILES AND THE LIKE

[75] Inventor: John F. Castagna, Brooklyn, N.Y.
[73] Assignee: Sparkomatic Corporation, Milford, Pa.
[21] Appl. No.: 142,459
[22] Filed: Apr. 21, 1980
[51] Int. Cl.³ .............. B60R 11/02; G12B 9/02; H04R 1/02
[52] U.S. Cl. .............. 179/146 R; 179/1 VE; 179/178; 181/150; 455/350
[58] Field of Search .............. 179/146 E, 146 R, 179, 179/178, 184, 1 E, 1 VE; 181/150, 148, 199, 171; 455/350

[56] References Cited

U.S. PATENT DOCUMENTS

| 4,032,725 | 6/1977 | McGee | 179/146 R |
| 4,179,009 | 12/1979 | Birkner | 181/171 |

FOREIGN PATENT DOCUMENTS

| 1487311 | 4/1969 | Fed. Rep. of Germany | 179/184 |
| 463576 | 11/1968 | Switzerland | 179/178 |

Primary Examiner—Thomas W. Brown
Attorney, Agent, or Firm—Mason, Fenwick & Lawrence

[57] ABSTRACT

A multirange thin speaker assembly for installation in automobile doors and like constricted space installations in compact automobiles and the like with the front of the assembly facing toward the automobile interior, including a main speaker section having a speaker basket frame provided with mounting ears for receiving front mounting screws to fix the speaker basket frame against an interior wall portion of the automobile door. The main speaker section includes a woofer speaker unit and a bridge member supported from the basket frame carrying a tweeter speaker unit. A front grille panel of unitary plastic material has a pair of transversely spaced arcuate rear snap ring segments forming an interrupted annular ring projecting rearwardly from the panel to interfit in an anchor ring member carried by the basket frame, each having radially outwardly projecting bead formations to snap behind retaining shoulders of the anchor ring to fasten the grille panel to the anchor ring.

13 Claims, 8 Drawing Figures

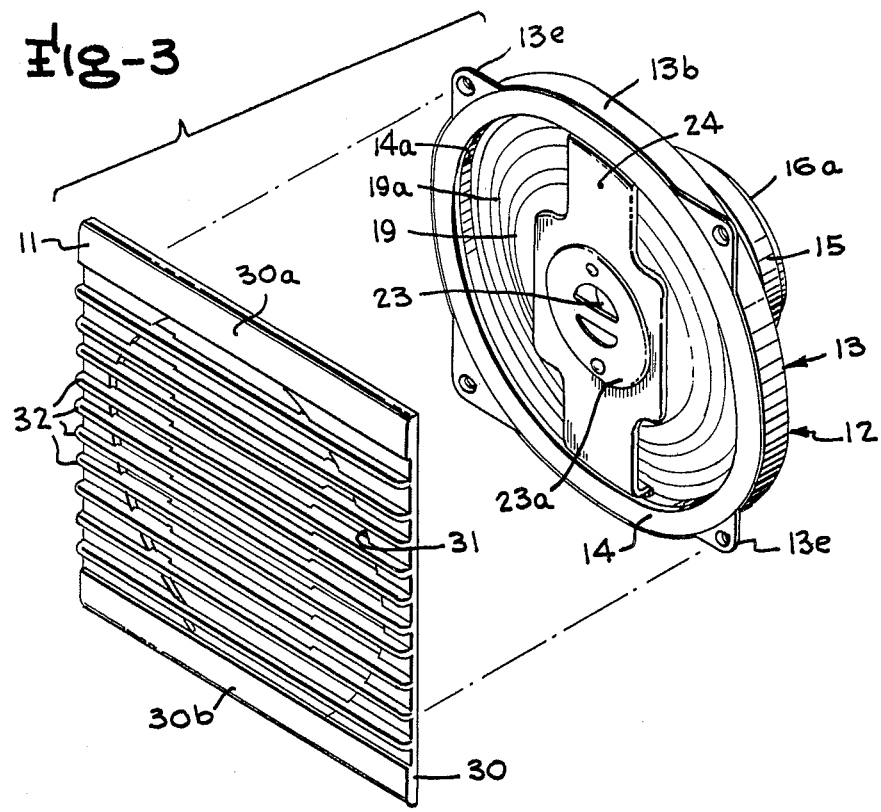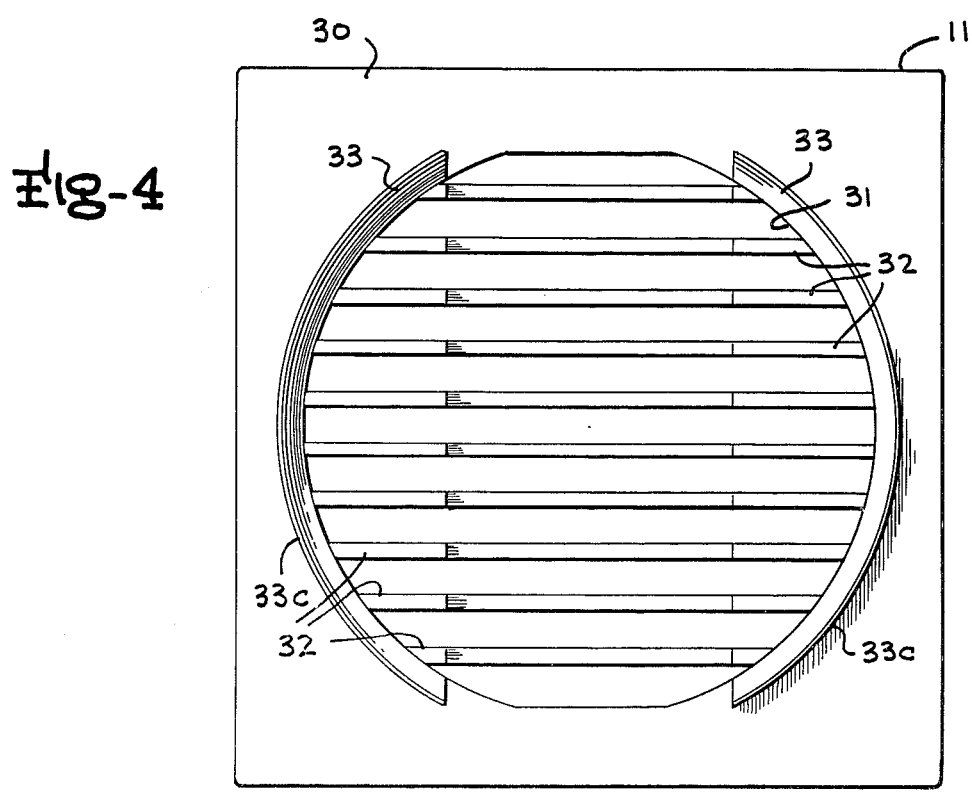

GRILLE COVERED SPEAKER ASSEMBLY CONSTRUCTION FOR COMPACT AUTOMOBILES AND THE LIKE

BACKGROUND AND OBJECTS OF THE INVENTION

The present invention relates in general to multirange automobile type speakers for stereo sound reproducing systems and the like, and more particularly to two-way stereo speaker structures for compact automobiles and the like having severely limited space capable of providing tweeter and midrange sound reproducers and mounting structure conveniently adaptable to mounting such speakers on the doors of compact automobiles and the like.

Conventional electrodynamic speakers customarily comprise a cone of semi-rigid material which is secured at its outer edge to a rigid frame. In many instances, the cone is corrugated near the outer edge to provide a degree of flexibility in this region of the cone so as to permit the cone to move as a piston under the influence of a voice coil which is secured to the cone at its apex. The voice coil is located within a cylindrical gap of a magnet which provides a substantially constant magnetic field across the gap. The magnetic field set up by the audio frequency currents supplied to the voice coil interacts with the constant field of the magnet with the result that physical forces are applied to the voice coil which tend to move the voice coil and the attached cone in a direction parallel to the axis of the cone.

In recent years, with the advent of sophisticated stereo radio receiver and tape player systems in automobiles, the demand for good fidelity speakers structurally suitable for the automobile environment, with its inherent restrictions of space, size, and shock loading limitations, has continuously increased, and design of speakers to meet these conditions has become progressively difficult, especially with the advent of compact cars and reduced weight and size of cars to accommodate to the petroleum shortage problems.

Many automobile type speakers in current use are of the two-way or three-way type. These speakers customarily separate the audio spectrum so that the large cone speaker handles the bass part of sound, and a second or third speaker handles the "midrange" and treble or tweeter part of the sound spectrum. Space limitations, particularly the depth required for ordinary speakers of customary configuration, which are hereinafter generally referred to as "deep" speakers, create severe problems for those desiring to install high fidelity stereo sound systems in small automobiles, particularly where it is desired to provide such two-way or three-way speakers in the doors of automobiles such as compact cars and X-body cars. The depth and mechanical nature of ordinary deep speakers is simply such that they are incapable of being reasonably incorporated in door mount systems or limited depth locations in compact or X-body automobiles.

Furthermore, it is normal in the mounting of conventional speakers to secure the basket or main ring portion of the speaker by screw fasteners applied from the rear onto a structurally rigid baffle board to mount the basket or mounting frame, the cone, the centering spider, the voice coil support and the voice coil on the stationary baffle wall, and separately attach the speaker grille or exterior speaker panel onto the baffle by screw fasteners or similar fasteners applied from the front of the baffle or wall in which the speaker is mounted. However, where it is desired to mount the speaker in a door or similar limited access structural portion of an automobile, or in the walls or ceiling of a room, it is usually not possible to attach any part of the speaker structure to the wall from the rear. Further, it is unsightly to mount the speaker grille or panel on the mounting surface. For this reason, it is desirable to provide some arrangement whereby the basket or main annular frame portion of the speaker supporting the cone and voice coil and magnet and pole structure, and supporting the tweeter, treble or high frequency sound reproducing speaker section or component, by some mounting method or system whereby the basket or annular main supporting ring portion may be screw-mounted or fastened to the baffle board or interior wall panel of the vehicle door, or other wall or barrier surface of a room, by fasteners directed rearwardly from the front surface of the mounting wall, and provide fastening devices on the grille or speaker panel permitting it to be advanced rearwardly into contact with the other speaker components and fastened thereto from in front of the speaker.

Also, in deep speakers of the customary construction, the flexible leads that connect the audio power to the lower range speaker components, such as the woofer speaker components, handling frequencies up to about 4000 HZ, and which connect the audio power to the tweeter and/or midrange section, are usually flexible leads that connect to the woofer and are extended and connect to the tweeter and/or midrange section through flexible leads. However, in the limited space constrictions encountered for automobile door installations for compacts and X-body automobiles, speakers designed to the limited depth dimensions available are so limited in space that connection of flexible leads between the woofer and the higher frequency midrange/tweeter speaker is so difficult as to be impractical.

An object of the present invention is the provision of a novel multirange speaker construction for limited spaces in automobile doors and like constricted space installations, arranged to facilitate mounting of the speaker components by fasteners applied from the front of the speaker structure and having a novel grille structure or speaker panel which can be assembled with the remaining speaker components from the front of the speaker.

Another object of the present invention is the provision of the novel slim speaker structure including multirange speaker sections, as for high fidelity stereo sound systems in automobiles and the like, especially adapted for compact automobiles, wherein the speaker is designed especially to fit into limited spaces such as doors and like constricted locations in compact automobiles and the like requiring very thin speaker structures, while still maintaining good sound reproduction from plural sound generating diaphragm structures designed for different frequency ranges.

Another object of the present invention is the provision of a novel speaker system as described in either of the two preceding paragraphs, wherein novel electrical connection means are provided to achieve efficient speaker designs of highly restricted slim speaker restrictions.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 3 is an exploded front perspective view of the speaker and grille;

FIG. 4 is a rear elevation view of the grille;

DETAILED DESCRIPTION OF A PREFERRED EMBODIMENT

Figure 1:
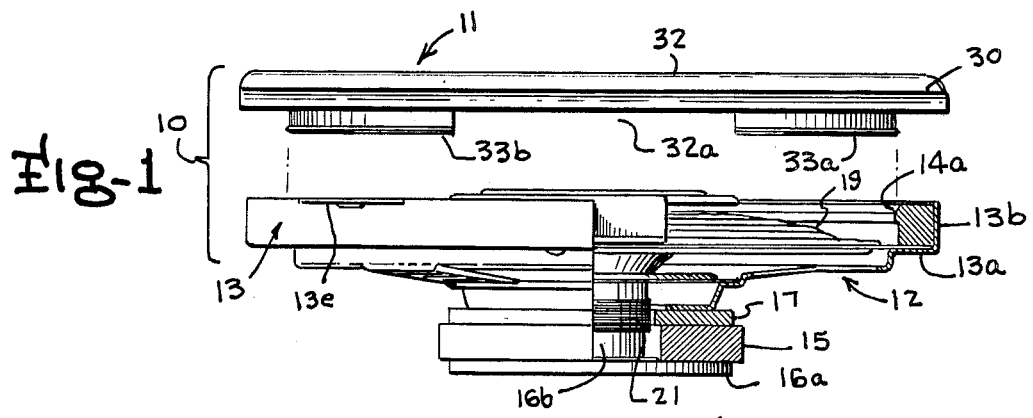
FIG. 1 is an exploded side elevational view of the thin speaker and speaker grille spaced just forwardly from the speaker, with the right half of the speaker shown in section taken along the section plane 1—1 of FIG. 2.
Figure 2:
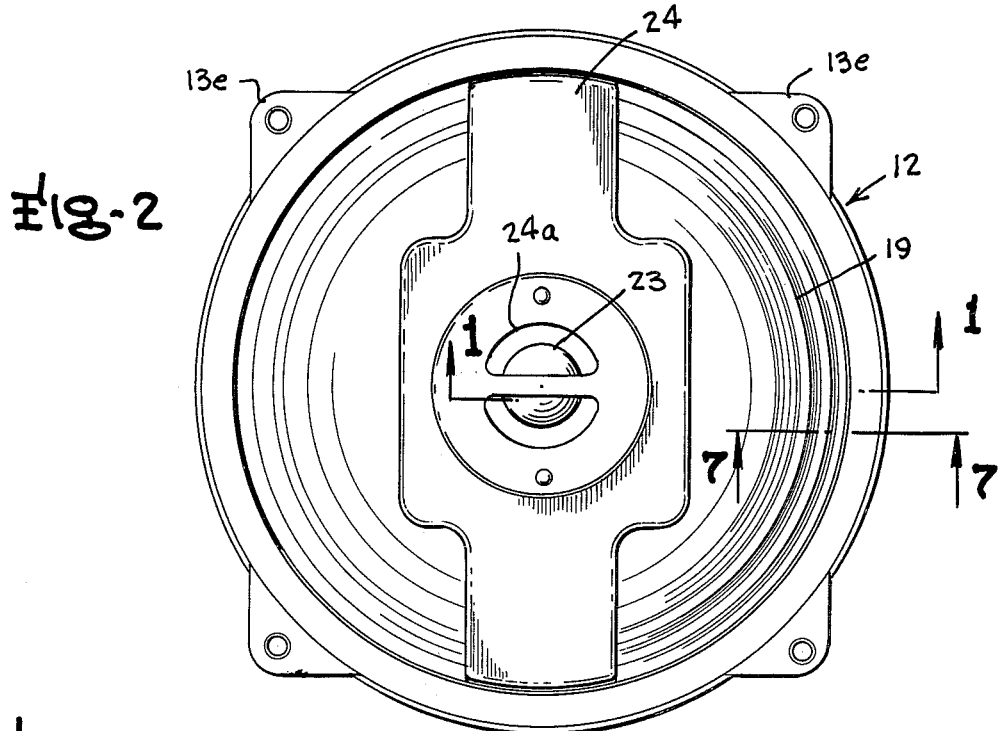
FIG. 2 is a front elevational view of the speaker portion.
Figure 7:
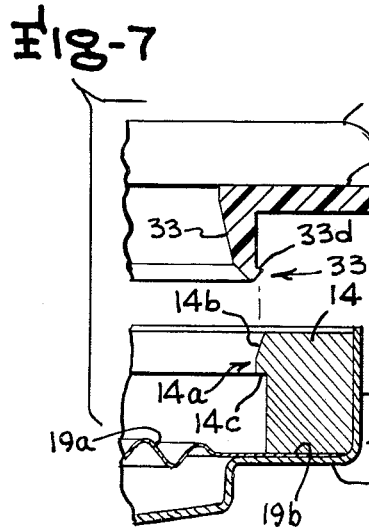
FIG. 7 is a detailed fragmentary section view, to enlarged scale, of adjacent portions of the grille and speaker components, taken along the section plane 7—7 of FIG. 2.

Referring to the drawings, wherein like reference characters designate corresponding parts throughout the several figures, the speaker assembly of the present invention, indicated in general by the reference character 10, comprises a removable speaker grille 11 forming the front cover panel for the speaker assembly and the basic speaker assembly 12 having a novel design to provide a considerably thinner configuration than is available with ordinary deep speaker designs, providing a thin speaker of 1½ inch axial depth, with a lower overall depth or low silhouette to fit in almost every door of the latest compact and X-body automobile designs.

The basic speaker section 12 includes the metallic speaker basket 13 having an annular outer cup-like rim portion formed by the annular back wall portion 13a and connecting forwardly projecting cylindrical flange wall 13b in which an anchor ring 14 is seated and having four spider legs 13c extending radially inwardly from the annular back wall perimeter portion 13a to an annular spider suspension ring 13d to support the magnet assembly of the speaker. A plurality of circumferentially spaced apertured mounting ears 13e project from the forward-most edges of the outer cylindrical flange portion 13b, at four locations in the illustrated embodiment, to receive mounting screws for mounting the basket 13 to the inside wall panel or structural surface of the automobile door in which the speaker is to be installed.

To achieve the desired low profile providing an axial depth of no greater than 1½ inches for the speaker assembly, the magnet structure assembly is reduced in size from the usual deep speaker configuration, and includes an annular strontium-cobalt woofer magnet 15, which permits size reduction by about ¼ without loss of gap energy, and includes pole pieces formed by the center pole 16 having a circular plate portion 16a forming the rearmost end plate of the pole assembly of a diameter close to but slightly less than the outer diameter of the annular magnet 15, and having a forwardly projecting smaller diameter cylindrical center pole formation 16b projecting through the center opening of the magnet to a location spaced toward the front of the speaker from the front face of the magnet 15, and surrounded by the annular forward pole piece plate 17 of the same outer diameter as the rearmost end plate portion 16a of the center pole 16 and defining therewith an annular recess in which the annular magnet 15 is seated in engagement with the end plate portions 16a and 17 of the pole pieces. The pole pieces therefore provide maximum flux densities resulting in high efficiency, smooth response. The magnet assembly structure formed of the magnet 15 and pole piece components 16 and 17 are affixed to and carried by the spider suspension ring portion 13d of the basket 13 by known adhesive bonding materials or similar fastening techniques and may, if desired, include a fiber spacer between the inner ring portion 13d of the basket 13 and the pole piece end plate component 17 to prevent magnetic energy from dissipating into the basket.

The woofer cone for this low profile thin speaker could not be of the traditional pryamid-shaped cone configuration ordinarily used in standard deep speakers, because of the shallow height or axial depth of the new speaker, and accordingly a novel forwardly convex curve-shaped woofer cone 19 was employed in the speaker, provided with an undulating or sinuous cross sectioned hinge portion 19a near its outer rim 19b and the forwardly bowed or convex section shape over the remainder of the cone 19. The outer rim portion 19b of the woofer cone 19 is fixed to the outer rim portion of the basket 13 between the peripheral back wall portion 13a and the anchor ring 14, as by conventional bonding materials, and the inner annular edge of the woofer cone 19 is joined to and supports the thin voice coil form 20 having the voice coil winding 21 carried thereon located in the air gap between the inner edge of the front end plate pole piece 17 and the adjacent confronting forward most portions of the cylindrical boss 16b of the center pole 16. This speaker is designed as a two-way speaker, with the large cone 19 and its voice coil 21 and magnet 15 handling the bass part of the sound in the frequency range from about 100 HZ to 4000 HZ, serving as the woofer, and a second speaker, which is of the conventional dome-horn loaded type, indicated generally by reference character 23 is mounted forwardly spaced from and aligned with the center opening portion of the woofer cone 19, to handle the midrange/tweeter part of the sound spectrum in the range of about 4000 to 17000 HZ. The dome-horn loaded tweeter 23 in the preferred embodiment of the present invention is a conventional one inch dome-horn loaded tweeter, supported in a bridge structure 24 having an annular center opening portion 24a to which the mounting rim portion 23a of the tweeter assembly is secured by rivets or similar fasteners, and includes an outer flange portion 24b which is secured by rivets to the peripheral back wall portion 13a of the basket at diametrically opposite locations.

Figure 8:
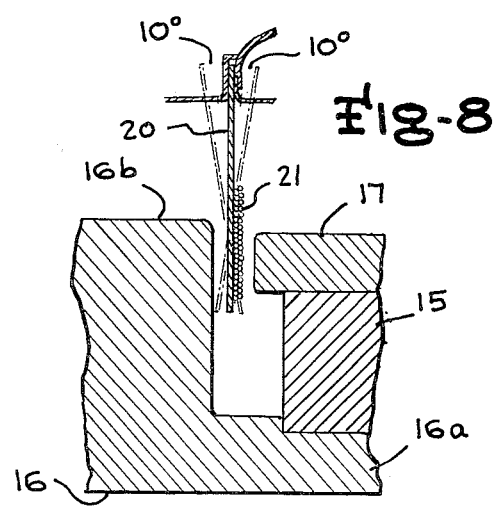
FIG. 8 is a greatly enlarged diagram of the voice coil and gap therefor showing its tilting range.
Figure 5:
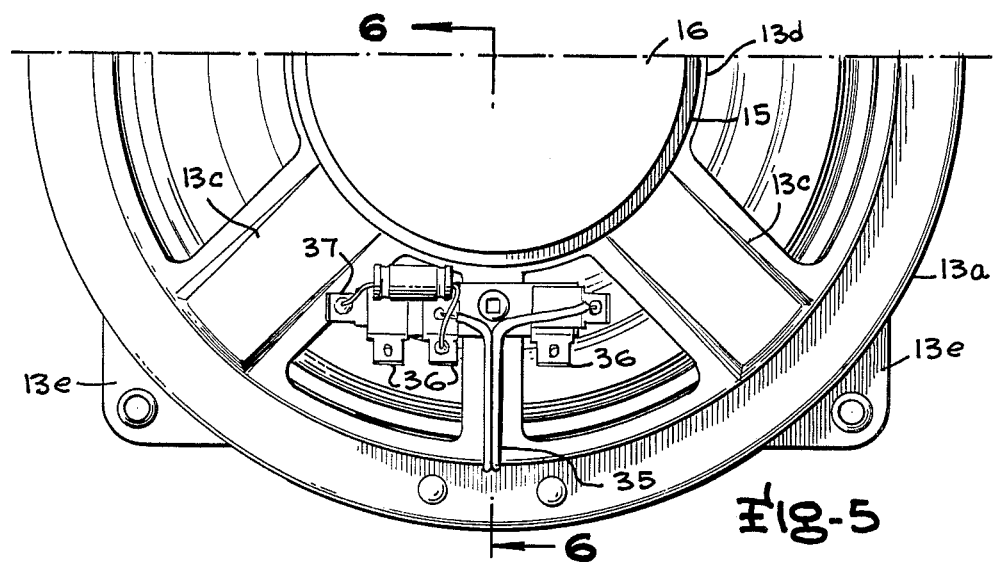
FIG. 5 is a rear elevation view of the lower half of the speaker assembly, to enlarged scale.
Figure 6:
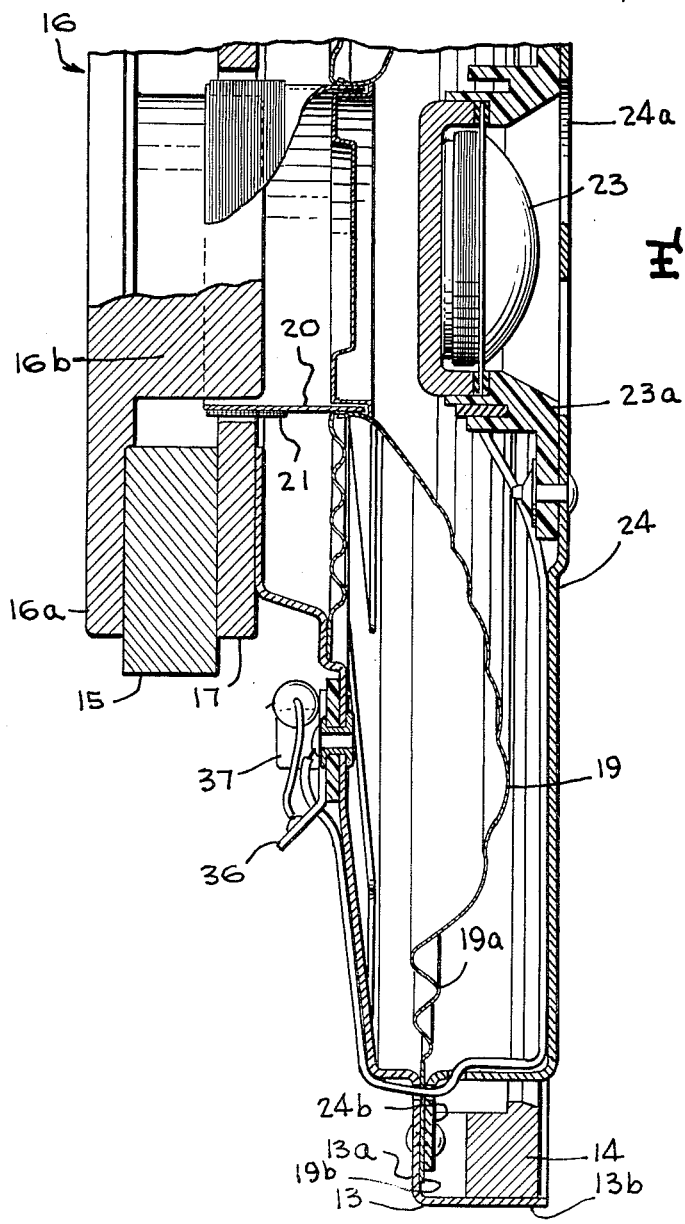
FIG. 6 is a fragmentary section view of the speaker, taken along line 6—6 of FIG. 5 at enlarged scale.

The spider hinge action of the usual damper or centering device suspension structure of regular speakers that normally keeps the voice coil in a linear pattern during operation could not be relied upon with this shallow speaker. Shallow speakers are vulnerable to voice coil rubbing because the space between the spider suspension and the cone hinge portion is small. Ideally, the cone of a speaker should move as a piston and not sway in its normal in and out motion during sound generating operation. In deep speakers, this kind of movement is obtained more easily than with narrow or shallow designs, since the two bearing points formed by the spider and the cone hinge between which the cone moves are further apart, and the further these bearing points are spaced from each other, the more nearly the piston or cone travels in a straight line. As these two bearing points are brought closer together, as in shallow speakers, there is increased possibility of greater tilting of the piston. To overcome this problem in the speaker of the present invention, the end plate portions 17, 16a of the magnet pole pieces were made as thin as possible and the voice coil depth into the magnet structure was kept small. The gap size was maintained approximately as in other speakers, so that with this arrangement, as illustrated in the greatly enlarged diagrammatic section of FIG. 8, the cone can be tilted over a range of about 10° without rubbing, thus avoiding the voice coil rubbing problem with this shallow speaker configuration.

The speaker grille or front panel 11 is especially constructed to be front-mounted onto the basic speaker section 12 after the latter has been fastened to the inside panel or surface portion of the automobile door or the like by a friction catch arrangement whereby the speaker grille 11 can be assembled to the anchor ring 14 of the basic speaker section 12 by pressing it rearwardly in the direction of the magnet structure formed by the magnet 15 and pole pieces 16,17. To this end, the grille 11 in the preferred embodiment is of generally rectangular configuration as illustrated in FIGS. 3 and 4 and is formed of a one-piece unitary plastic molding of generally rectangular outline formed of a rectangular main panel portion 30 in the form of a solid unitary plastic panel having a circular center opening 31 of a diameter corresponding substantially to the inner diameter of the anchor ring 14 traversed at vertically spaced intervals by horizontal grille bars 32 spanning the entire width of the panel portion 30 and forming rectangular cross-section horizontal ribs which project forwardly beyond the plane of the front surface of the top and bottom edge portions 30a,30b of the main panel portion 30. Projecting rearwardly from the rear surface of the main panel portion 30 of the grille 11 is an interrupted annular snap ring 33 formed of two arcuate segments 33a,33b corresponding in outer diameter substantially to the inner diameter of the radially inwardly projecting annular lip formation 14a of the anchor ring 14, and having a radially outwardly projecting continuous or uninterrupted bead or snap shoulder formation 33c which may be either a radially outwardly progressing rear edge portion of the annular ring segments 33a,33b or may be forwardly facing shoulder 33d perpendicular to the center axis of the speaker system or inclined slightly to that perpendicular plane. The bead or snap shoulder formation 33c of the annular ring segments 33 of the speaker grille have a diameter that is very slightly smaller than the inside diameter of the anchor ring shoulder formation 14a and is designed to be snap fitted into place in assembled relation with the anchor ring 14 by being cammed inwardly toward the center axis of the grille by the slight bevel surface 14b at the entrance to the anchor ring restraining lip 14a and then return outwardly by the force of the elastic memory of the ring segments 33a,33b to project the bead or snap shoulder formations 33c behind the shoulder portion 14c of the anchor ring restraining lip 14a to thereby secure the grille 11 in position. When snapping the grille 11 into the anchor ring 14 of the basic speaker section 12, the annular ring segments 33a,33b of the grille collapse slightly inwardly due to the elasticity of the plastic material and partly due to the fact that the middle section of the grille can bend slightly in the areas where the grille bars 32 are undercut, as indicated at 32a, to receive the bridge structure 24 for the dome-horn tweeter 23, so that the slight "give" in the mid-portion of the grille 11 allows the bead or shoulder portion of the arcuate ring segments 33a,33b to pass by the restraining ledge or lip portion 14a of the anchor ring, permitting the grille 11 to become seated in locked position restrained by the annular retaining lip portion 14a.

It should also be noted that in deep speakers, the flexible leads that connect the audio power to the woofer are extended and also connect to the midrange or tweeter speaker portions through flexible leads, but such an arrangement is not possible in the shallow or low profile speakers for limited depth door installations for which the present speaker is designed. In the speaker of the present invention, the space between the woofer cone 19 and the midrange/tweeter speaker 23 is very limited and connecting extended flexible leads from the woofer connection terminals to the midrange/tweeter speakers is very difficult. To overcome this problem, the midrange/tweeter speaker is connected separately, by providing connection lead 35 from the basket terminal post 36 to the dome-horn loaded tweeter 23 and another lead 37 to the voice coil 21 of the woofer.

I claim:

1. A multirange thin speaker assembly for installation in automobile doors and like constricted space installations in compact automobiles and the like with the front of the assembly facing inwardly of the automobile to project sound toward the automobile interior, comprising a main speaker section including a speaker basket frame having an outer generally annular rim portion supporting an anchor ring member and mounting formations for receiving front mounting fasteners to fix the speaker basket frame against an interior wall portion of the automobile door by outwardly directed fasteners applied from the automobile interior, the main speaker section including a woofer speaker unit comprising a speaker magnet and pole structure supported rigidly from the basket frame and a deformable woofer cone peripherally supported from said rim portion having a voice coil carried thereby movable in a gap in the pole structure, bridge structure supported by said rim portion having a higher-frequency-range second speaker unit carried thereby forwardly of said voice coil in the direction of sound projection, a front grille panel of unitary plastic material to be assembled in a snap-on manner onto the main speaker section, the grille panel including a generally flat panel portion having a plurality of openings therethrough disposed in an array to form an interrupted sound transmitting opening forwardly aligned with the woofer cone and a pair of transversely spaced arcuate rear snap ring segments forming an interrupted annular ring projecting rearwardly from the panel portion of a diameter closely conforming to the inner diameter of said anchor ring member to interfit therein, said anchor ring member having a retaining lip formation about its inner edge defining a rearwardly facing retaining shoulder for the grille panel and said snap ring segments having radially outwardly projecting bead formations to snap behind said retaining shoulder to fasten the grille panel to the anchor ring.

2. A multirange thin speaker assembly as defined in claim 1, wherein said second speaker unit is a dome-horn loaded tweeter whose center axis is forwardly aligned with the center axis of the woofer speaker unit.

3. A multirange thin speaker assembly as defined in claim 1, wherein said grille panel has a flexibly mid-zone spanning the panel over the space between the snap ring segments accommodating warping of the grille panel to interfit the beads of the snap ring segments behind said retaining shoulder.

4. A multirange thin speaker assembly as defined in claim 2, wherein said grille panel has a flexibly bendable mid-zone spanning the panel over the space between the snap ring segments accommodating warping of the grille panel to interfit the beads of the snap ring segments behind said retaining shoulder.

5. A multirange thin speaker assembly as defined in claim 1, wherein said grilled panel has a transverse center axis transversely spanning the grille panel in a predetermined direction to perpendicularly intersect the center axis of the woofer speaker unit, and said arcuate snap ring segments being symmetrically spaced oppositely from said transverse center axis defining a flexibly bendable mid-zone of the panel over the space between the snap ring segments accommodating warping of the grille panel to interfit the beads of the snap ring segments behind said retaining shoulder.

6. A multirange thin speaker assembly as defined in claim 2, wherein said grilled panel has a transverse center axis transversely spanning the grille panel in a predetermined direction to perpendicularly intersect the center axis of the woofer speaker unit, and said arcuate snap ring segments being symmetrically spaced oppositely from said transverse center axis defining a flexibly bendable mid-zone of the panel over the space between the snap ring segments accommodating warping of the grille panel to interfit the beads of the snap ring segments behind said retaining shoulder.

7. A multirange thin speaker assembly as defined in claim 1, including an elongated speaker supporting bridge member diametrically spanning the main speaker section having opposite end portions fastened to said speaker basket frame and having a center opening and mounting surround means for receiving and supporting said second speaker unit in forwardly spaced axial alignment with the center axis of the woofer speaker unit.

8. A multirange thin speaker assembly as defined in claim 2, including an elongated speaker supporting bridge member diametrically spanning the main speaker section having opposite end portions fastened to said speaker basket frame and having a center opening and mounting surround means for receiving and supporting said tweeter second speaker unit in forwardly spaced axial alignment with the center axis of the woofer speaker unit.

9. A multirange thin speaker assembly as defined in claim 5, including an elongated speaker supporting bridge member diametrically spanning the main speaker section having opposite end portions fastened to said speaker basket frame and having a center opening and mounting surround means for receiving and supporting said second speaker unit in forwardly spaced axial alignment with the center axis of the woofer speaker unit.

10. A multirange thin speaker assembly as defined in claim 6, including an elongated speaker supporting bridge member diametrically spanning the main speaker section having opposite end portions fastened to said speaker basket frame and having a center opening and mounting surround means for receiving and supporting said tweeter speaker unit in forwardly spaced axial alignment with the center axis of the woofer speaker unit.

11. A multirange thin speaker assembly as defined in claim 9, including an elongated speaker supporting bridge member diametrically spanning the main speaker section having opposite end portions fastened to said speaker basket frame and having a center opening and mounting surround means for receiving and supporting said second speaker unit in forwardly spaced axial alignment with the center axis of the woofer speaker unit, said bridge member being a plate-like structure whose width corresponds substantially to the width of, and interfits, in said bendable mid-zone of said panel in the interruption spaces between said snap ring segments.

12. A multirange thin speaker assembly as defined in claim 10, including an elongated speaker supporting bridge member diametrically spanning the main speaker section having opposite end portions fastened to said speaker basket frame and having a center opening and mounting surround means for receiving and supporting said tweeter speaker unit in forwardly spaced axial alignment with the center axis of the woofer speaker unit, said bridge member being a plate-like structure whose width corresponds substantially to the width of, and interfits in,said bendable mid-zone of said panel in the interruption spaces between said snap ring segments.

13. A multirange thin speaker assembly as defined in any of claims 1, or 2, or 5 or 6 or 7 or 9 or 11 or 12, wherein each of said arcuate snap ring segments extend uninterruptedly over the major portion of a semicircle and include a radially outwardly projecting bead-like lip to interfit rearwardly behind said retaining shoulder.

* * * * *